US012800982B2

(12) United States Patent
Kremer

(10) Patent No.: US 12,800,982 B2
(45) Date of Patent: Nov. 17, 2026

(54) LIGHT SOURCE UNIT FOR AN IMAGING DEVICE AND METHOD

(71) Applicant: LEICA MICROSYSTEMS CMS GMBH, Wetzlar (DE)

(72) Inventor: Manuel Kremer, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 322 days.

(21) Appl. No.: 18/327,088

(22) Filed: Jun. 1, 2023

(65) Prior Publication Data

US 2023/0400677 A1 Dec. 14, 2023

(30) Foreign Application Priority Data

Jun. 9, 2022 (EP) .................................... 22178228

(51) Int. Cl.
*G02F 1/35* (2006.01)
*G02F 1/355* (2006.01)
*G02F 1/39* (2006.01)
*H01S 3/00* (2006.01)

(52) U.S. Cl.
CPC ............ *G02F 1/353* (2013.01); *G02F 1/3503* (2021.01); *G02F 1/3528* (2021.01); *G02F 1/3551* (2013.01); *G02F 1/39* (2013.01); *G02F 1/392* (2021.01); *H01S 3/0078* (2013.01); *G02F 2203/055* (2013.01); *H01S 3/0092* (2013.01)

(58) Field of Classification Search
CPC ...... G02F 1/3503; G02F 1/3528; G02F 1/353; G02F 1/3551; G02F 1/39; G02F 1/392; G02F 2203/055; H01S 3/0092
See application file for complete search history.

(56) References Cited

U.S. PATENT DOCUMENTS 7,982,943 B2 * 7/2011 Okuno .................. G02F 1/3513 359/341.1
8,792,156 B1 7/2014 Kieu et al.
8,902,495 B2 * 12/2014 Clowes ............... H01S 3/06758 359/341.32
9,570,878 B2 2/2017 Clowes et al.
12,379,641 B2 * 8/2025 Andersen ............. G02F 1/3528
(Continued)

OTHER PUBLICATIONS

Jurgen Landskron (Schaumburg & Partner), Letter regarding European Patent Application No. 22178228.7, three pages (Year: 2024).*

*Primary Examiner* — Daniel Petkovsek
(74) *Attorney, Agent, or Firm* — LEYDIG, VOIT & MAYER, LTD.

(57) ABSTRACT

A light source unit for an imaging device includes a beam extraction unit configured to receive broadband laser light, to direct at least a part of the broadband laser light having a first wavelength into an amplifier beam path, and to direct a residual laser light into a first illumination beam path. The light source unit further includes an optical amplifier unit arranged in the amplifier beam path and configured to generate amplified laser light having the first wavelength by amplifying the part of the broadband laser light, and a frequency changing unit arranged in the amplifier beam path and configured to generate laser light having a second wavelength from the amplified laser light having the first wavelength.

20 Claims, 8 Drawing Sheets

(56) References Cited

U.S. PATENT DOCUMENTS

| | | | | |
|---|---|---|---|---|
| 2009/0097512 | A1* | 4/2009 | Clowes | H01S 3/0085 372/21 |
| 2012/0062983 | A1 | 3/2012 | Imeshev et al. | |
| 2012/0292531 | A1* | 11/2012 | Grudinin | G02F 1/395 359/328 |
| 2013/0271765 | A1* | 10/2013 | Couderc | G02F 1/365 356/402 |
| 2017/0317462 | A1* | 11/2017 | Zou | H01S 3/1305 |
| 2022/0276153 | A1* | 9/2022 | Sahara | G02F 1/365 |

* cited by examiner

LIGHT SOURCE UNIT FOR AN IMAGING DEVICE AND METHOD

CROSS REFERENCE TO RELATED APPLICATIONS

This application claims benefit to European Patent Application No. EP 22178228.7, filed on Jun. 9, 2022, which is hereby incorporated by reference herein.

FIELD

Embodiments of the present invention relate to a light source unit for an imaging device. Embodiments of the present invention further relate to a method for generating laser light.

BACKGROUND

Typical laser light sources generate laser light that comprises a very narrow wavelength band centered around a single wavelength. Broadband laser light sources on the other hand generate laser light that comprises a wide spectrum of wavelengths often called continuum. One common way to generate a wide spectrum is to use micro-structured glass fibers, for example photonic crystal fibers (PCF) in combination with a pulsed laser.

Broadband laser light sources are used as versatile excitation light sources in fluorescence microscopy. Typically, an acousto optic tunable filter is used to select laser light comprising wavelengths of one or more spectral bands from the wide spectrum. The selected laser light is then directed onto a sample in order to excite fluorophores located in the sample. The optimal excitation wavelength for a specific fluorescent dye or protein can easily be selected from the wide spectrum of the broadband laser light by adjusting the acousto optical tunable filter. This results in a high excitation efficiency that allows high-quality microscopy images to be obtained without causing stress to the sample, for example by overexciting the sample.

However, for maximum flexibility, light sources used in fluorescence microscopy need to be able to excite a number of different fluorescent dyes and fluorescent proteins with different excitation spectra. Therefore, broadband laser light sources intended for use as excitation sources in fluorescence microscopy should be capable of emitting excitation light over the entire visible spectrum. However, it is very complex, and therefore expensive to generate such a broad spectrum from a single laser light source. Especially when generating laser light with short wavelengths, the micro-structured glass fibers typically used in broadband laser light sources suffer greatly from the increased stress, resulting in a short lifetime. Thus, broadband laser light sources often have no, or insufficient, light output in the short-wavelength region of the visible spectrum, i.e. the blue spectral range around 400 nm.

SUMMARY

Embodiments of the present invention provide a light source unit for an imaging device. The light source unit includes a beam extraction unit configured to receive broadband laser light, to direct at least a part of the broadband laser light having a first wavelength into an amplifier beam path, and to direct a residual laser light into a first illumination beam path. The light source unit further includes an optical amplifier unit arranged in the amplifier beam path and configured to generate amplified laser light having the first wavelength by amplifying the part of the broadband laser light, and a frequency changing unit arranged in the amplifier beam path and configured to generate laser light having a second wavelength from the amplified laser light having the first wavelength.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
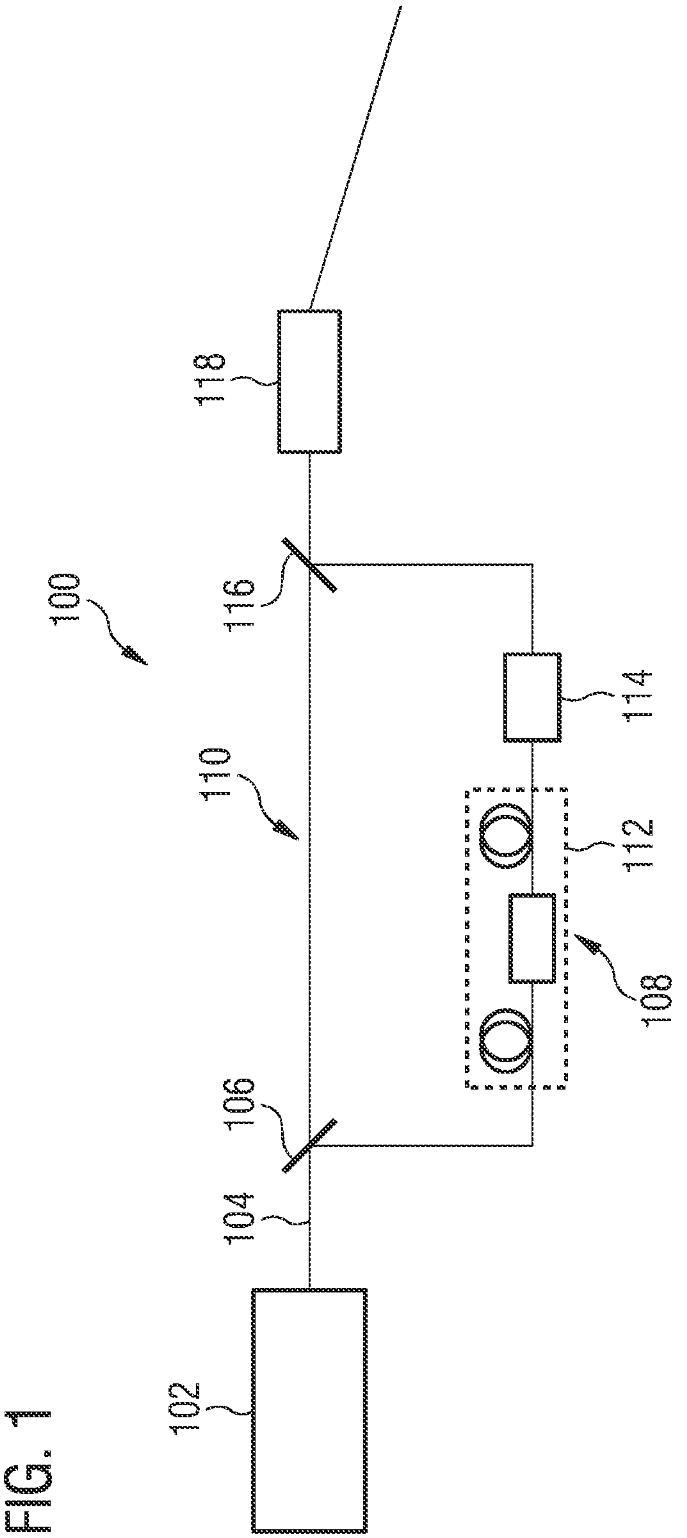
FIG. 1 is a schematic view of a light source unit for an imaging device according to an embodiment.

Embodiments of the present invention provide a light source unit for an imaging device and a method that provide a cost-effective means for generating laser light having a broad spectrum including the short-wavelength region of the visible spectrum.

The light source unit for an imaging device according embodiments of the present invention includes a beam extraction unit configured to receive broadband laser light, to direct at least a part of the broadband laser light having a first wavelength into an amplifier beam path, and to direct a residual laser light into a first illumination beam path. The light source unit also includes an optical amplifier unit that is arranged in the amplifier beam path and configured to amplify the laser light having the first wavelength. The light source unit further includes a frequency changing unit that is arranged in the amplifier beam path and configured to generate laser light having a second wavelength from the amplified laser light having the first wavelength.

The laser light having the first wavelength is extracted from the broadband laser light and directed into amplifier beam path that is separate from the illumination beam path. In the amplifier beam path, the laser light having the first wavelength is amplified. The amplified laser light is then frequency shifted from the first wavelength to the second wavelength. This arrangement can be used to generate laser light having the second wavelength which lies outside of the spectrum of the broadband laser light. Thereby, the proposed light source unit provides means to extend the spectrum of the broadband laser light, in particular into the short-wavelength region of the visible spectrum, i.e. the blue part of the spectrum around 400 nm.

Since only one source of broad band laser light is used and no additional laser light sources are needed, the proposed light source unit is therefore very cost-effective. The proposed light source unit can also be made very compact for the same reason. The short-wavelength laser light is generated outside the source of the broadband laser light. Thus, the short-wavelength laser light cannot damage the microstructured fibers typically used in such sources, thereby extending the lifetime of the source of the broad band laser light. Additionally, if the light source for the broadband laser light is pulsed, the laser light with the second wavelength is also synchronized with the residual laser light. This is particularly important for fluorescence imaging applications based on a fluorescence lifetime, and allows the light source unit to be used for further applications, for example pulsed interleaved excitation microscopy.

In an embodiment, the frequency changing unit is configured to direct the laser light having the second wavelength into a second illumination beam path. In this embodiment, the light source unit includes two distinct illumination beam paths. The residual laser light and laser light having the second wavelength can be used independently of each other making the light source unit even more versatile.

In another embodiment, the light source unit includes a beam unification unit configured to couple the laser light having the second wavelength into the first illumination beam path. In this embodiment, the light source unit includes only one illumination beam path. Both the residual laser light and laser light having the second wavelength are combined into a single beam of phase-synchronous laser light. The resulting single beam of excitation light has a broad spectrum and can be used to excite a variety of different fluorescent dyes and/or fluorescent proteins.

In another embodiment, the light source unit includes at least one acousto optical tunable filter arranged in at least one of the first illumination beam path and the second illumination beam path. For example, the acousto optical tunable filter may be arranged in the single illumination beam path following the beam unification unit. In such an embodiment, the acousto optical tunable filter may be used to select a specific excitation wavelength or wavelength band from the extended spectrum provided by the light source unit. Thereby, the light source unit provides a very flexible source of excitation light that can excite a large number of different fluorophores. Such an excitation light source can be used to great benefit in fluorescence microscopy, in particular in scanning and/or confocal microscopy, for example. It is also possible to arrange one acousto optical tunable filter in each of the two illumination beam paths. The additional acousto optical tunable filter in the second illumination beam path can be used to select whether the laser light having the second wavelength is switched on or not, or to adjust the intensity of the laser light having the second wavelength. Alternatively, the optical amplifier unit can be controlled such that no laser light having the second wavelength is generated.

In another embodiment, the beam extraction unit is configured to direct at least a part of the broadband laser light having a first polarization into the amplifier beam path, and to direct laser light having a second polarization into the first illumination beam path. This might be accomplished e.g. by a polarizing beam splitter.

Alternatively, or additionally, acousto optical tunable filters filter out light of a certain polarization, i.e. either s-polarization or p-polarization. Therefore, when an acousto optical tunable filter is used to select a specific excitation wavelength or wavelength band, light having the polarization that is filtered by the acousto optical tunable filter cannot be utilized, for example as excitation light. This otherwise unused laser light is extracted from the broadband laser light and used to generate the laser light having the second wavelength, thereby not wasting broadband laser light and making the light source unit more efficient. In order to combine the laser light having the second wavelength and the residual laser light back together, the polarization of the laser light having the second wavelength needs to be changed, for example by a waveplate or a prism or a simple mirror-arrangement.

In another embodiment, the beam extraction unit includes an edge filter, in particular a short pass filter. An edge filter either blocks light having a wavelength above a center wavelength or below the center wavelength. In this embodiment, the beam extraction unit acts like an edge filter, in particular like a short pass filter, in the sense that the beam extraction unit directs most of the broadband laser light having a wavelength above the center wavelength into the amplifier beam path. The residual laser light, i.e. most of the broadband laser light having a wavelength below the center wavelength, is directed into the first illumination beam path. The edge filter may in particular be realized by a beam splitting element, for example a dichroic beam splitter. Alternatively, a dedicated filter element may be arranged between the beam splitting element and the optical amplifier unit. Both a dichroic beam splitter and dedicated filter element acting as the edge filter are less expensive than for example acousto optic tunable filter, thereby making the beam extraction unit more cost effective.

In another embodiment, the beam extraction unit includes a band pass having a center wavelength equal to the first wavelength. A band pass is a filter that blocks all wavelengths of light except a wavelength band around a center wavelength. In this embodiment, the beam extraction unit acts like a band pass filter in the sense that the beam extraction unit directs most of the broadband laser light having a wavelength in the wavelength band around the center wavelength into the amplifier beam path. The band pass may in particular be realized by a beam splitting element, for example a dichroic beam splitter. Alternatively, a dedicated filter element may be arranged between the beam splitting element and the optical amplifier unit. Like in the previously described embodiment, a dichroic beam splitter and dedicated filter element acting as the band pass filter are less expensive than for example acousto optic tunable filter, thereby making the beam extraction unit more cost effective.

In another embodiment, the frequency changing unit is configured to perform a parametric process in order to generate the laser light having the second wavelength from the amplified light having the first wavelength. The parametric processes uses a non-linear optical effect in order to achieve the wavelength shift from the first wavelength to the second wavelength. In particular, the parametric process is second harmonic generation or higher harmonic generation. During second harmonic generation the frequency of the amplified light is doubled, i.e. the wavelength of the amplified light is halved. During higher harmonic generation the frequency of the amplified light is changed by an integer factor. For example, during third harmonic generation, the frequency is tripled, during fourth harmonic generation, the frequency is quadrupled, and so on. By way of the parametric process, shorter wavelength light is generated from the light that has been extracted from the broadband laser light. Thereby, the spectrum of the broadband laser light is extended towards the short-wavelength region making the light source unit even more versatile.

In another embodiment, the frequency changing unit includes a first collimating lens, a nonlinear optical crystal, and a second collimating lens arranged in that order in the amplifier beam path. The nonlinear optical crystal is preferably a periodically poled lithium niobate crystal or a Barium borate crystal. However, other types of crystals may be used as the nonlinear optical crystal. Nonlinear optical crystals are passive optical elements, i.e. they require at most a simple control circuit comprising a Peltier-element for temperature control in order to function. The frequency changing unit therefore has a particularly simple design making the light source unit easier to manufacture.

In another embodiment, the second wavelength has a value between 350 nm and 450 nm, in particular between 380 nm and 420 nm. In this embodiment, the second wavelength is in the blue, i.e. short-wavelength, region of the visible spectrum. Laser light in this wavelength region is used in many fluorescence imaging applications, for example biological experiments that use DAPI as a fluorophore for staining cell nuclei. Since many broadband laser light sources do not provide light in the wavelength region and the broadband laser light sources that do are expensive, the light source unit according to the present embodiment fills an important gap, providing a cost-effective broadband laser light source that can be used in a wide range of applications.

In another embodiment, the first wavelength has a value between 700 nm and 900 nm, in particular between 760 nm and 840 nm. Many broadband laser light sources provide laser light in the red and near infrared region. This light can be extracted, amplified, and then frequency doubled into light in the range between 350 nm and 450 nm, in particular between 380 nm and 420 nm. As has been described above, this wavelength region is important for many applications in fluorescence imaging.

In another embodiment, the light source unit includes a supercontinuum light source configured to generate the broadband laser light, and to direct the broadband laser light into the beam extraction unit. Supercontinuum lasers are laser light sources that typically use a micro-structured glass fiber to generate broadband laser light from a pulsed laser light source. Typically, the pulsed laser light source has a pulse length in the femto- to picosecond range and emits light having wavelengths in the near infrared. The broadband laser light generated by supercontinuum lasers is both longer- and shorter-wavelength than the wavelength of the original pulsed laser light which is also called seed laser light. Since supercontinuum light sources use a single pulsed seed laser light source they are compact compared to arrangements that use multiple different laser light sources in order to generate broadband laser light or light having multiple single wavelengths. Thus, by using a supercontinuum light source the light source unit can also be made very compact.

In another embodiment, the light source unit includes an optical amplifier control unit. The supercontinuum light source is pulsed. The optical amplifier control unit is configured to set parameters of the optical amplifier unit in accordance with a pulse rate of the supercontinuum light source. When the amplification of the extracted light having the first wavelength is done in accordance with the pulse rate of the supercontinuum light source, the extracted light can be amplified more efficiently. Thereby, less of the extracted light is wasted and more of the extracted light can be put to use, for example to excite fluorophores. This makes the light source unit more efficient.

In another embodiment, the light source unit includes an optical amplifier control unit. The optical amplifier control unit is configured to set parameters of the optical amplifier unit in accordance with the power of the supercontinuum light source. In this embodiment, the amplification of the extracted light having the first wavelength is done in accordance with the power of the supercontinuum light source, the extracted light can be amplified more efficiently. Thereby, less of the extracted light is wasted and more of the extracted light can be put to use, for example to excite fluorophores. Further, damage to the optical amplifier unit can be prevented. This makes the light source unit more efficient.

The inventions also relates to an imaging device comprising light source unit described above. Preferably, the imaging device is a microscope, in particular a confocal microscope and/or a scanning microscope. The imaging device has the same advantages as the light source unit described above.

The invention further relates to a method for generating laser light. The method includes the following steps: Receiving broadband laser light. Directing at least a part of the broadband laser light having a first wavelength into an amplifier beam path. Directing a residual laser light into a first illumination beam path. Amplifying the light having the first wavelength. Generating light having a second wavelength from the amplified light having the first wavelength.

The method has the same advantages as the light source unit described above and can be supplemented using the features of the dependent claims directed at the light source unit.

FIG. 1 is a schematic view of a light source unit 100 for an imaging device 800 according to an embodiment.

The light source unit 100 includes a broadband laser light source 102 exemplary formed as a supercontinuum light source that is configured to generate broadband laser light 104. The broadband laser light 104 includes laser light having a wide range of wavelengths in the visible spectrum and the near infrared and might extend into the infrared. An exemplary spectrum of the broadband laser light 104 is described below with reference to FIG. 5. The broadband laser light source 102 is arranged and configured to emit the broadband laser light 104 in the direction of a beam extraction unit 106. The beam extraction unit 106 extracts a part of the broadband laser light 104, and directs the extracted part of the broadband laser light 104 into an amplifier beam path 108. The remaining part of the broadband laser light 104, i.e. the part not extracted, is directed into an illumination beam path 110 by the beam extraction unit 106 and will be called residual laser light in the following. The extracted part of the broadband laser may include laser light having wavelengths from a narrow wavelength band around a first wavelength. In this case, the beam extraction unit 106 functions as a band pass filter. The extracted part of the broadband laser may also include laser light of all wavelengths above a certain wavelength including the first wavelength. In this case, the beam extraction unit 106 functions as an edge filter. In any case, the extracted part of the broadband laser includes laser light having the first wavelength.

The extracted part of the broadband laser is directed into an optical amplifier unit 112 arranged in the amplifier beam path 108. The optical amplifier unit 112 is adapted to amplify laser light having the first wavelength in order to generate amplified laser light. An exemplary spectrum of the amplified laser light is described below with reference to FIG. 6. The amplified laser light is then directed into a frequency changing unit 114 arranged in the amplifier beam path 108. The frequency changing unit 114 generates laser light having a second wavelength from the amplified laser light having the first wavelength. However, the frequency changing unit 114 might not convert all light having the first wavelength into light having the second wavelength, and so the laser light generated by the frequency changing unit 114 might include both the first wavelength and the second wavelength. An exemplary spectrum of the laser light generated by the frequency changing unit 114 is described below with reference to FIG. 7.

In the present embodiment, the laser light generated by the frequency changing unit 114 is then directed into a beam unification unit 116 arranged at an intersection of the first illumination beam path 110 and the amplifier beam path 108. The beam unification unit 116 combines the residual light with the laser light generated by the frequency changing unit 114 into combined laser light by coupling the laser light generated by the frequency changing unit 114 back into the illumination beam path 110.

Figure 8:
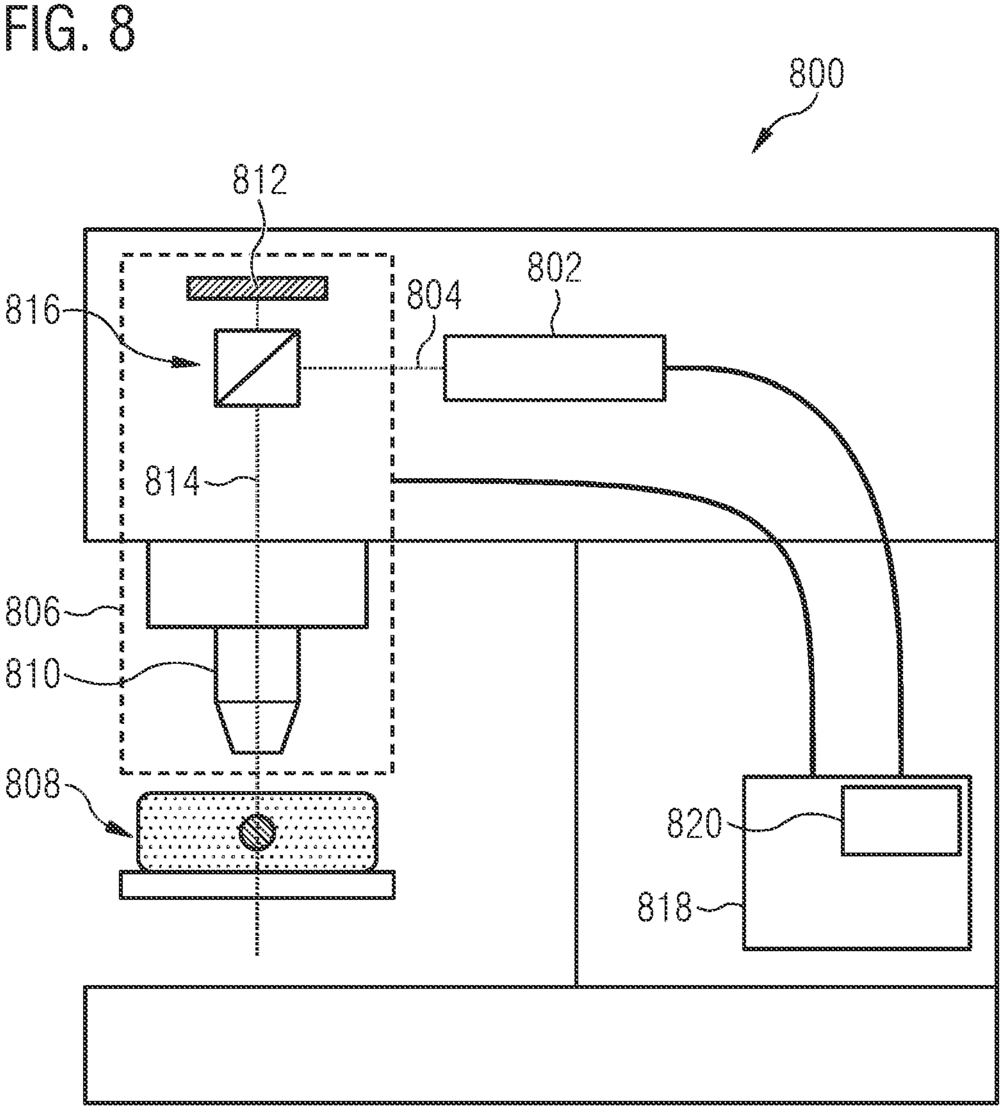
FIG. 8 is a schematic view of an imaging device according to an embodiment.

An acousto optical tunable filter 118 is arranged in the illumination beam path 110 following the beam unification unit 116. The acousto optical tunable filter 118 can be used to filter one or more spectral bands from the combined laser light, for example in order to generate excitation light that can be directed onto a sample 808 (c.f. FIG. 8) for exciting fluorophores located inside the sample 808.

Figure 2:
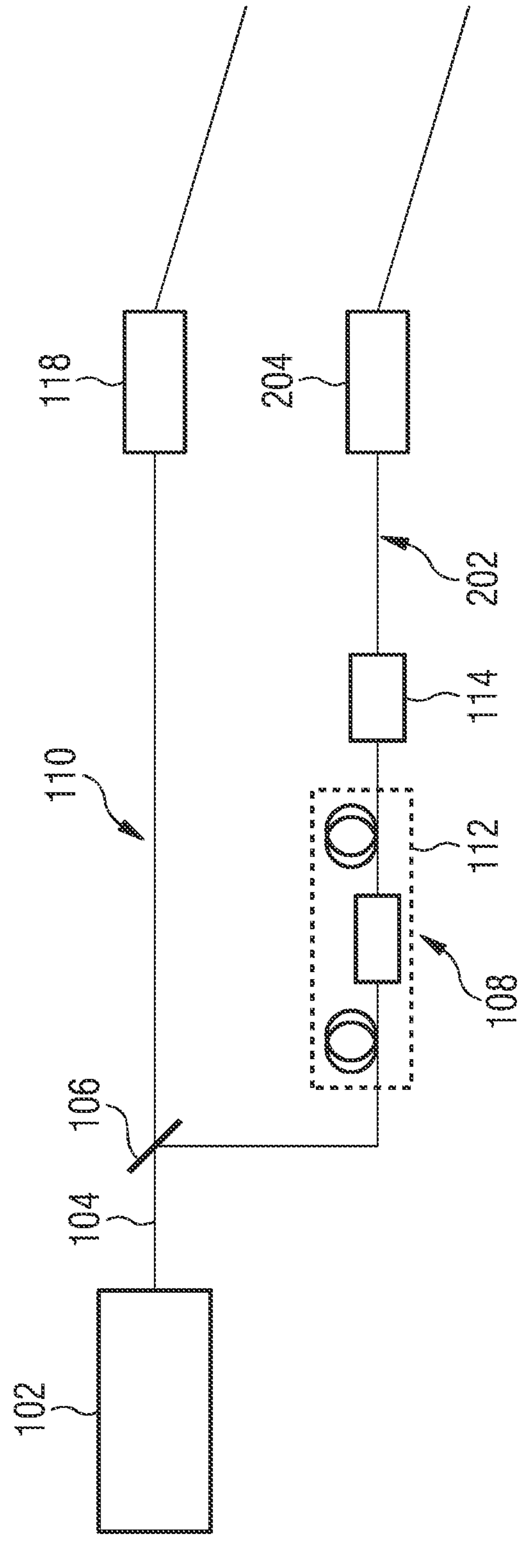
FIG. 2 is a schematic view of a light source unit according to another embodiment having two illumination beam paths.

FIG. 2 is a schematic view of a light source unit 200 according to another embodiment.

The light source unit 200 according to FIG. 2 is distinguished from the light source unit 100 according to FIG. 1 in having a second illumination beam path 202. The second illumination beam path 202 begins following the frequency changing unit 114, and includes a second acousto optical tunable filter 204. The second acousto optical tunable filter 204 is used to control the intensity of the laser light generated by the frequency changing unit 114 before said laser light is emitted by the light source unit 200, and for example used as excitation light. In the present embodiment, the light source unit 200 does not include the beam unification unit 116. The first acousto optical tunable filter 118 is arranged in the first illumination beam path 110 directly following the beam extraction unit 106.

Figure 3:
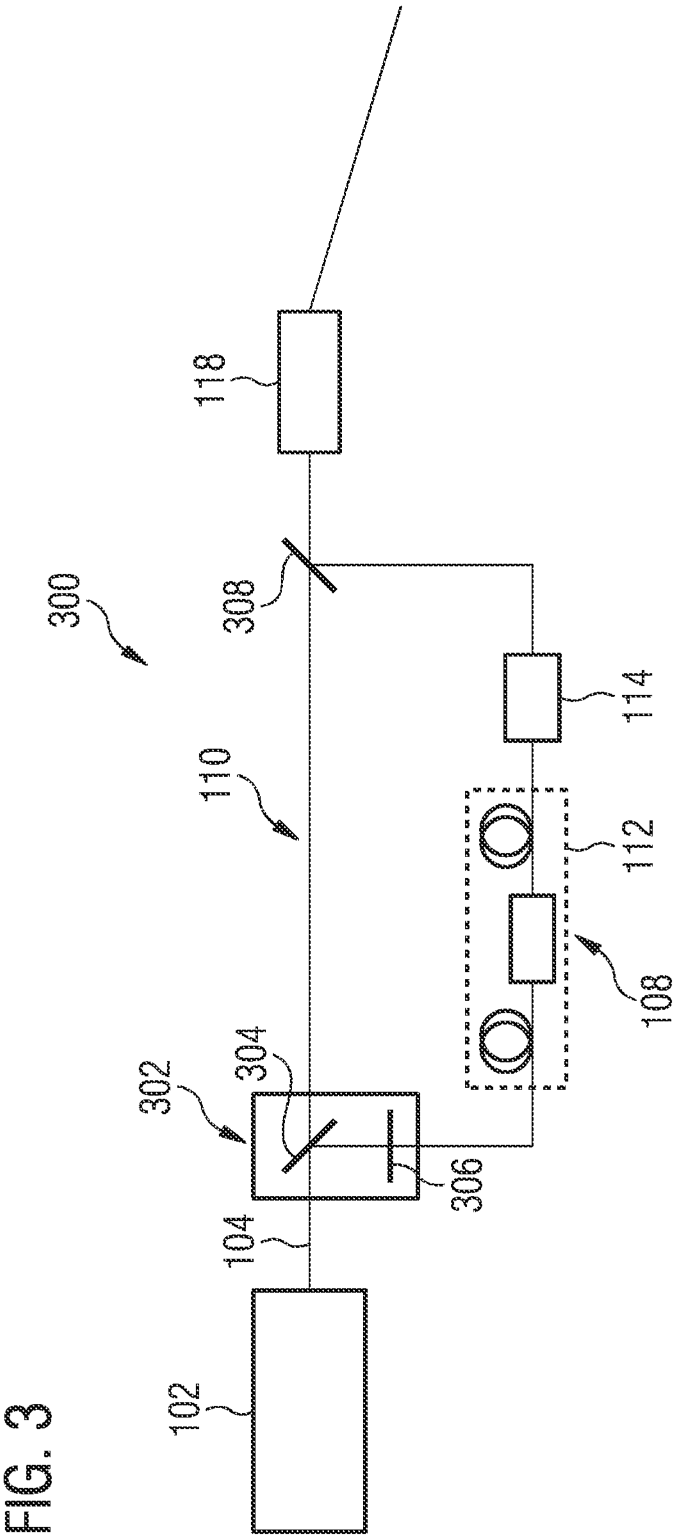
FIG. 3 is a schematic view of a light source unit according to another embodiment having a polarized beam splitter element.

FIG. 3 is a schematic view of a light source unit 300 according to another embodiment.

The broadband laser light 104 is typically unpolarized, i.e. all polarizations are present in the broadband laser light 104. The first acousto optical tunable filter unit 118 filters out all laser light having either s-polarization or p-polarization. This means that approximately half of the broadband laser light 104 cannot be utilized by the light source unit 100 according to FIG. 1. The light source unit 300 according to FIG. 3 is therefore distinguished from the light source unit 100 according to FIG. 1 in that the beam extraction unit 302 extracts laser light from the broad band laser light based on polarization.

According to the present embodiment, the beam extraction unit 302 includes a beam splitting element 304 that is configured to direct laser light having a first polarization into the amplifier beam path 108, and to direct laser light having a second polarization into the first illumination beam path 110. The beam extraction unit 302 further includes a filter element 306 that is arranged in the amplifier beam path 108 between the beam splitting element 304 and the optical amplifier unit 112. The filter element 306 is optional and may be a band pass configured to filter all wavelengths but a narrow band around the first wavelength. Alternatively, the filter element 306 may also be an edge filter configured to filter laser light of all wavelengths below a certain wavelength. The filter element 306 is used to filter out wavelengths except the first wavelength in order to adapt the extracted part of the broadband laser to the amplification profile of the optical amplifier unit 112.

In the present embodiment, the beam unification unit 308 might include a polarization changing element, for example a waveplate, that is configured to change the polarization of the laser light generated by the frequency changing unit 114 to the second polarization, i.e. polarization of the residual laser light. This ensures that the laser light generated by the frequency changing unit 114 is not filtered out by the first acousto optical tunable filter 118, and can therefore be utilized by the light source unit 100.

Figure 4:
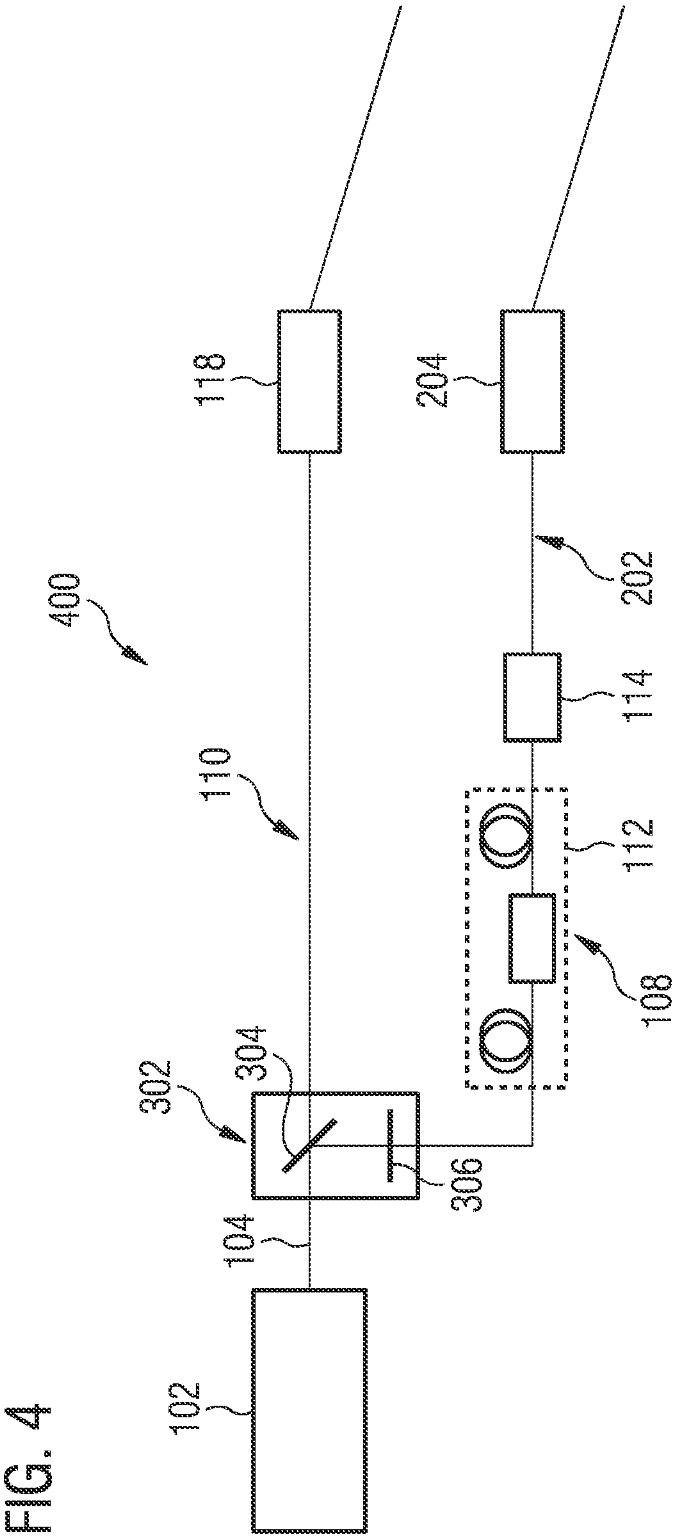
FIG. 4 is a schematic view of a light source unit according to another embodiment having the polarized beam splitter element and the second illumination beam path.

FIG. 4 is a schematic view of a light source unit 400 according to another embodiment.

The light source unit 400 according to FIG. 4 is distinguished from the light source unit 300 according to FIG. 3 in having a second illumination beam path 202. In other words, the light source unit 400 according to FIG. 4 is a combination of the light source unit 200 according to FIG. 2 and the light source unit 300 according to FIG. 3. The second illumination beam path 202 includes the second acousto optical tunable filter 204. In the present embodiment, the first acousto optical tunable filter 118 is configured not to filter laser light having the second polarization, i.e. polarization of the residual laser light, while the second acousto optical tunable filter 204 is configured not to filter laser light having the first polarization, i.e. the polarization of the laser light generated by the frequency changing unit 114.

Figure 5:
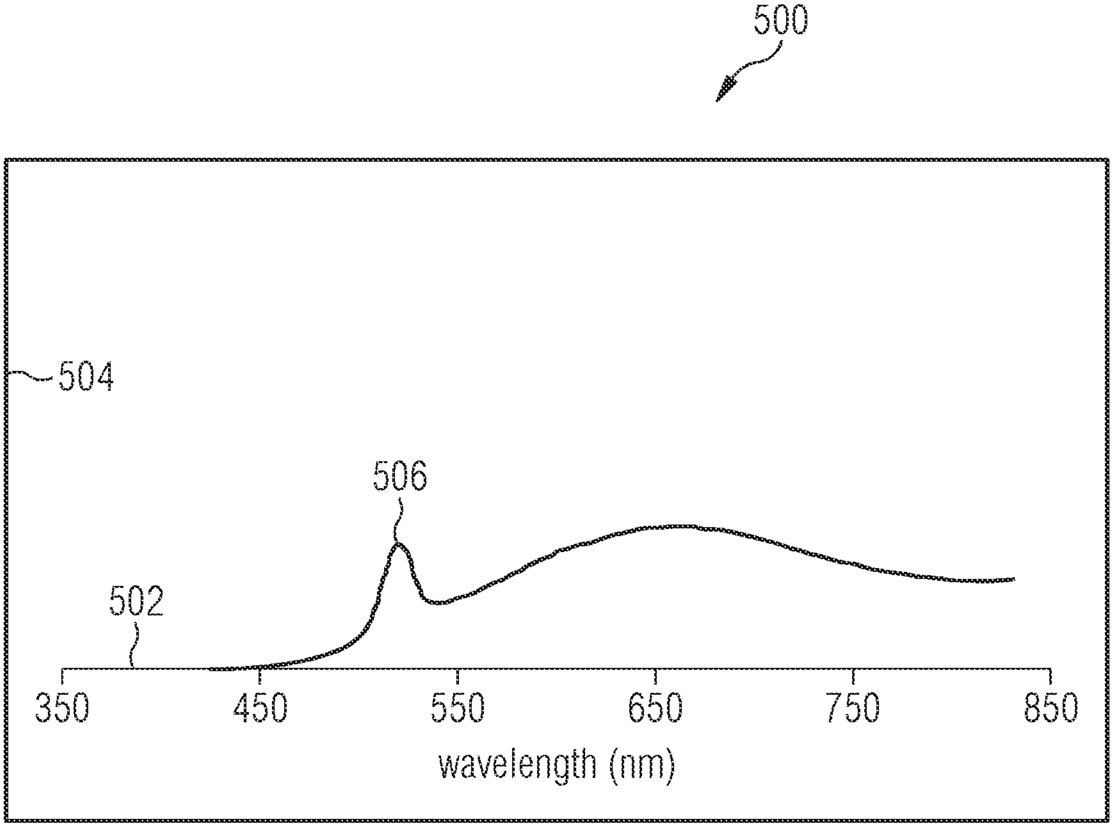
FIG. 5 is a schematic diagram of the spectrum of broadband laser light according to an embodiment.

FIG. 5 is a schematic diagram 500 of the spectrum of the broadband laser light 104.

The abscissa 502 of the diagram 500 denotes wavelength in nm. The ordinate 504 of the diagram 500 denotes intensity. The exemplary spectrum of the broadband laser light 104 shown in FIG. 5 includes wavelength from the blue region of the visible spectrum around 450 nm to the near infrared region around 850 nm. The intensity of the broadband laser light 104 is highest in the region between around 520 nm and around 750 nm. There is a noticeable peak 506 in intensity around 520 nm. Below wavelengths of around 520 nm the intensity sharply drops to zero, there is almost no intensity in the blue of the visible spectrum between around 400 nm to around 450 nm.

Figure 6:
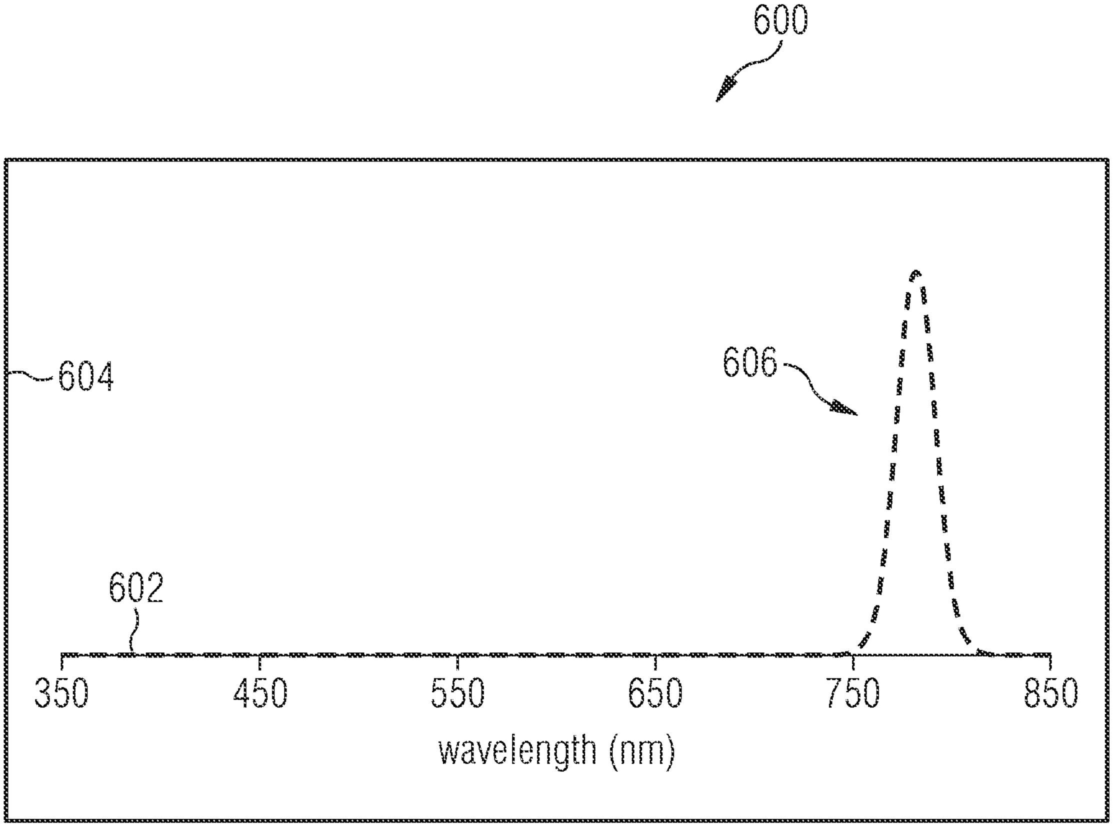
FIG. 6 is a schematic diagram of the spectrum of amplified laser light according to an embodiment.

FIG. 6 is a schematic diagram 600 of the spectrum of the amplified laser light.

The abscissa 602 of the diagram 600 denotes wavelength in nm. The ordinate 604 of the diagram 600 denotes intensity. The exemplary spectrum of the amplified laser light, i.e. the laser light amplified by the optical amplifier unit 112, includes a narrow band 606 around the first wavelength which is exemplary chosen to be 785 nm in the present embodiment.

Figure 7:
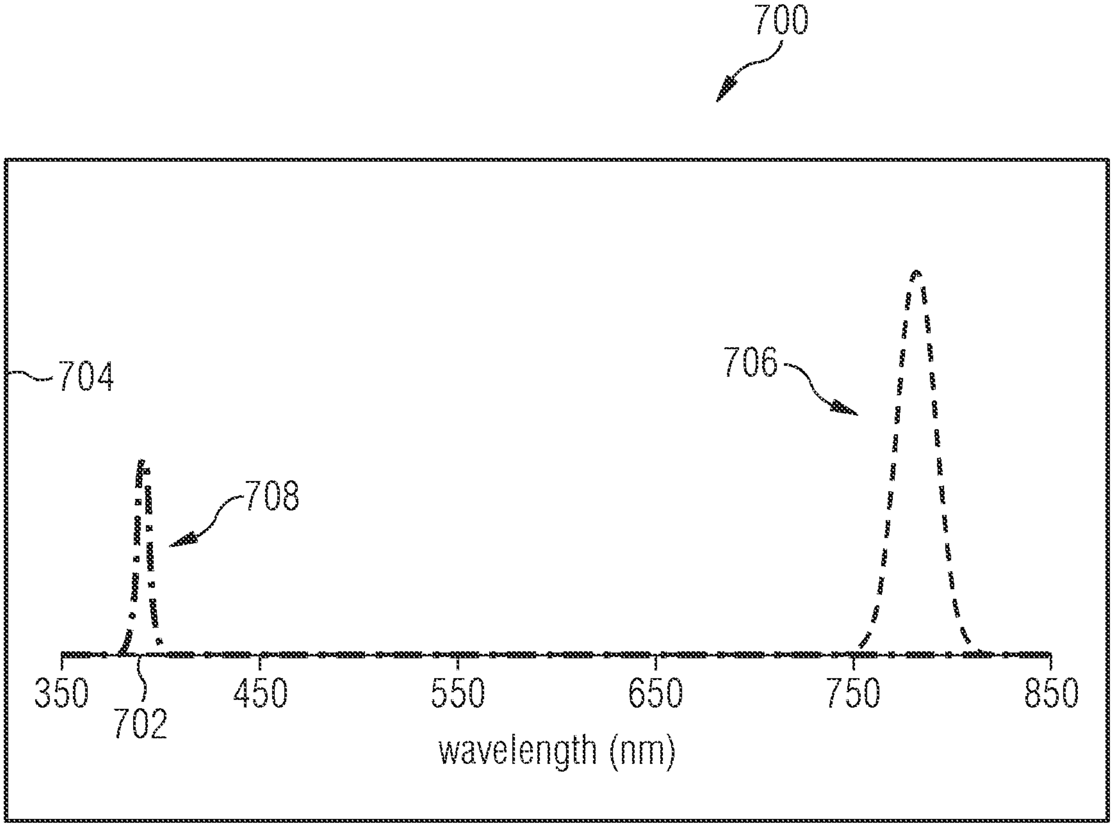
FIG. 7 is a schematic diagram of the spectrum of the laser light generated by a frequency changing unit according to an embodiment.

FIG. 7 is a schematic diagram 700 of the spectrum of the laser light generated by the frequency changing unit 114.

The abscissa 702 of the diagram 700 denotes wavelength in nm. The ordinate 704 of the diagram 700 denotes intensity. The exemplary spectrum of the laser light generated by the frequency changing unit 114 includes two narrow bands 706, 708. A first band 706 shown to the right in FIG. 7 includes wavelengths around the first wavelength. A second band 708 shown to the left in FIG. 7 includes wavelengths around the second wavelength, which is exemplary chosen to be 392.5 nm in the present embodiment, i.e. exactly half the first wavelength. In other words, the frequency changing unit 114 according to the present embodiment performs frequency doubling.

As can be seen in the diagram 700 shown in FIG. 7, the intensity of the laser light having the second wavelength is lower than the intensity of the laser light having the first wavelength. This is due to the fact that the frequency changing unit 114 does not convert all laser light having the first wavelength into laser light having the second wavelength. The wavelength conversion has a limited efficiency.

The first wavelength and the second wavelength in the embodiment described above with reference to FIGS. 5 to 7 have been chosen such that the spectrum of the broadband laser light 104 is extended by light in the blue spectral region around 400 nm. Laser light in the spectral region is expensive to generate with known broadband laser light sources but nonetheless important for certain fluorescence imaging applications, for example fluorescence imaging involving DAPI, typically used to image cell nuclei.

FIG. 8 is a schematic view of an imaging device 800 according to an embodiment.

The imaging device 800 is exemplary formed as a microscope. More specifically, the imaging device 800 is formed as a fluorescence microscope configured to image the sample 808 by means of fluorescence imaging.

The imaging device 800 includes one of the light source units 100, 200, 300, 400 described above with reference to FIGS. 1 to 7, and referenced in FIG. 8 by the common reference sign 802. The light source unit 802 is configured to emit the excitation light for exciting fluorophores located inside the sample 808 into an illumination beam path 804 of the imaging device 800.

An optical detection system 806 of the imaging device 800 is configured to generate images of the sample 808 based on fluorescence light emitted by the excited fluorophores. The optical detection system 806 according to the present embodiment includes an objective 810 directed at the sample 808, and a detector element 812. The objective 810 receives the fluorescence light emitted by the excited fluorophores and directs the fluorescence light into a detection beam path 814. A beam splitter 816 is located at an intersection of the illumination beam path 804 and the detection beam path 814, which are exemplary shown to be perpendicular to each other in the present embodiment. The beam splitter 816 is configured such that the excitation light is directed into the sample 808 via the objective 810. The beam splitter 816 is further configured such that the fluorescence light received by the objective 810 is directed towards the detector element 812.

The imaging system further includes a control unit 818 that is connected to the optical detection system 806 and the light source unit 802. The control unit 818 is configured to control the optical detection system 806 and the light source unit 802, for example based on a user input. The control unit 818 according to the present embodiment includes an optical amplifier control unit 820 configured to control the optical amplifier unit 112 of the light source unit 802.

Although the imaging device 800 has been exemplary described as a microscope, the imaging device 800 may be any other imaging device. In particular, the imaging device 800 may be any imaging device configured for fluorescence imaging.

Identical or similarly acting elements are designated with the same reference signs in all Figures. As used herein the term "and/or" includes any and all combinations of one or more of the associated listed items and may be abbreviated as "/". Individual features of the embodiments and all combinations of individual features of the embodiments among each other as well as in combination with individual features or feature groups of the preceding description and/or claims are considered disclosed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Light source unit
102 Broadband laser light source
104 Broadband laser light
106 Beam extraction unit
108 Amplifier beam path
110 Illumination beam path
112 Optical amplifier unit
114 Frequency changing unit
116 Beam unification unit
118 Acousto optical tunable filter
200 Light source unit
202 Illumination beam path
204 Acousto optical tunable filter
300 Light source unit
302 Beam extraction unit
304 Beam splitting element
306 Filter element
308 Beam unification unit
400 Light source unit
500 Diagram
502 Abscissa

504 Ordinate
506 Peak
600 Spectrum
602 Abscissa
604 Ordinate
606 Band
7000 Spectrum
702 Abscissa
704 Ordinate
706, 708 Band
800 Imaging device
802 Light source unit
804 Illumination beam path
806 Optical detection system
808 Sample
810 Objective
812 Detector element
814 Detection beam path
816 Beam splitter
818 Control unit
820 Optical amplifier control unit

The invention claimed is:

1. A light source unit for an imaging device, the light source unit comprising:

a beam extraction unit configured to receive broadband laser light, to direct at least a part of the broadband laser light having a first wavelength into an amplifier beam path, and to direct a residual laser light into a first illumination beam path, wherein the beam extraction unit is a wavelength-dependent splitter;

an optical amplifier unit arranged in the amplifier beam path and configured to generate amplified laser light having the first wavelength by amplifying the part of the broadband laser light; and a frequency changing unit arranged in the amplifier beam path and configured to generate laser light having a second wavelength from the amplified laser light having the first wavelength.

2. The light source unit according to claim 1, wherein the frequency changing unit is configured to direct the laser light having the second wavelength into a second illumination beam path.

3. The light source unit according to claim 2, further comprising at least one acousto-optical tunable filter arranged in at least one of the first illumination beam path and the second illumination beam path.

4. The light source unit according to claim 1, further comprising a beam unification unit configured to couple the laser light having the second wavelength into the first illumination beam path.

5. The light source unit according to claim 1, wherein the beam extraction unit comprises a short pass filter.

6. The light source unit according to claim 1, wherein the beam extraction unit comprises a band pass filter characterized by a center wavelength equal to the first wavelength.

7. The light source unit according to claim 1, wherein the frequency changing unit is configured to perform a parametric process in order to generate the laser light having the second wavelength from the amplified light having the first wavelength.

8. The light source unit according to claim 7, wherein the parametric process is second harmonic generation or higher harmonic generation.

9. The light source unit according to claim 8, wherein the frequency changing unit comprises a first collimating lens, a nonlinear optical crystal, and a second collimating lens arranged in that order in the amplifier beam path.

10. The light source unit according to claim 1, wherein the second wavelength has a value in a range between 350 nm and 450 nm.

11. The light source unit according to claim 1, wherein the first wavelength has a value in a range between 700 nm and 900 nm.

12. The light source unit according to claim 1, further comprising a supercontinuum light source configured to generate the broadband laser light and to direct the broadband laser light into the beam extraction unit.

13. The light source unit according to claim 12, further comprising an optical amplifier control unit, wherein the supercontinuum light source is pulsed, and wherein the optical amplifier control unit is configured to set parameters of the optical amplifier unit in accordance with a pulse rate of the supercontinuum light source.

14. The light source unit according to claim 12, further comprising an optical amplifier control unit configured to set parameters of the optical amplifier unit in accordance with a power of the supercontinuum light source.

15. An imaging device comprising the light source unit according to claim 1.

16. A method for generating laser light using the light source unit according to claim 1, the method comprising:

receiving, by the beam extraction unit that is the wavelength-dependent splitter, broadband laser light;

directing, by the beam extraction unit, at least a part of the broadband laser light having a first wavelength into an amplifier beam path, and directing a residual laser light into a first illumination beam path;

generating, by the optical amplifier unit arranged in the amplifier beam path, amplified laser light having the first wavelength by amplifying the part of the broadband laser light; and generating, by the frequency changing unit arranged in the amplifier beam path, laser light having a second wavelength from the amplified laser light having the first wavelength.

17. A light source unit for an imaging device, the light source unit comprising:

a beam extraction unit configured to receive broadband laser light, to direct at least a part of the broadband laser light having a first wavelength into an amplifier beam path, and to direct a residual laser light into a first illumination beam path, wherein the beam extraction unit is a wavelength-dependent splitter or a polarization-dependent splitter, and wherein the beam extraction unit includes an edge filter for directing at least a part of the broadband laser light having a wavelength above a center wavelength into the amplifier beam path, and directing the residual laser light having a wavelength below the center wavelength into the first illumination beam path;

an optical amplifier unit arranged in the amplifier beam path and configured to generate amplified laser light having the first wavelength by amplifying the part of the broadband laser light; and a frequency changing unit arranged in the amplifier beam path and configured to generate laser light having a second wavelength from the amplified laser light having the first wavelength.

18. The light source unit according to claim 17, wherein the edge filter comprises a beam splitting element or a dichroic beam splitter.

19. A light source unit for an imaging device, the light source unit comprising:

a beam extraction unit configured to receive broadband laser light, to direct at least a part of the broadband laser light having a first polarization into an amplifier beam path, and to direct laser light having a second polarization into a first illumination beam path, wherein the beam extraction unit is a polarization-dependent splitter;

an optical amplifier unit arranged in the amplifier beam path and configured to generate amplified laser light having a first wavelength by amplifying the part of the broadband laser light having the first polarization;

a frequency changing unit arranged in the amplifier beam path and configured to generate laser light having a second wavelength from the amplified laser light having the first wavelength; and a beam unification unit configured to couple the laser light having the second wavelength into the first illumination beam path, wherein the beam unification unit includes a polarization-changing element configured to change a polarization of the laser light having the second wavelength to the second polarization.

20. The light source unit of claim 19, further comprising at least one acousto-optical tunable filter arranged in the first illumination beam path, wherein the at least one acousto-optical tunable filter is configured to transmit the laser light having the second polarization.

* * * * *